C. E. MACARTHY.
Horse-Power.
No. 8,366. Reissued Aug. 13, 1878.
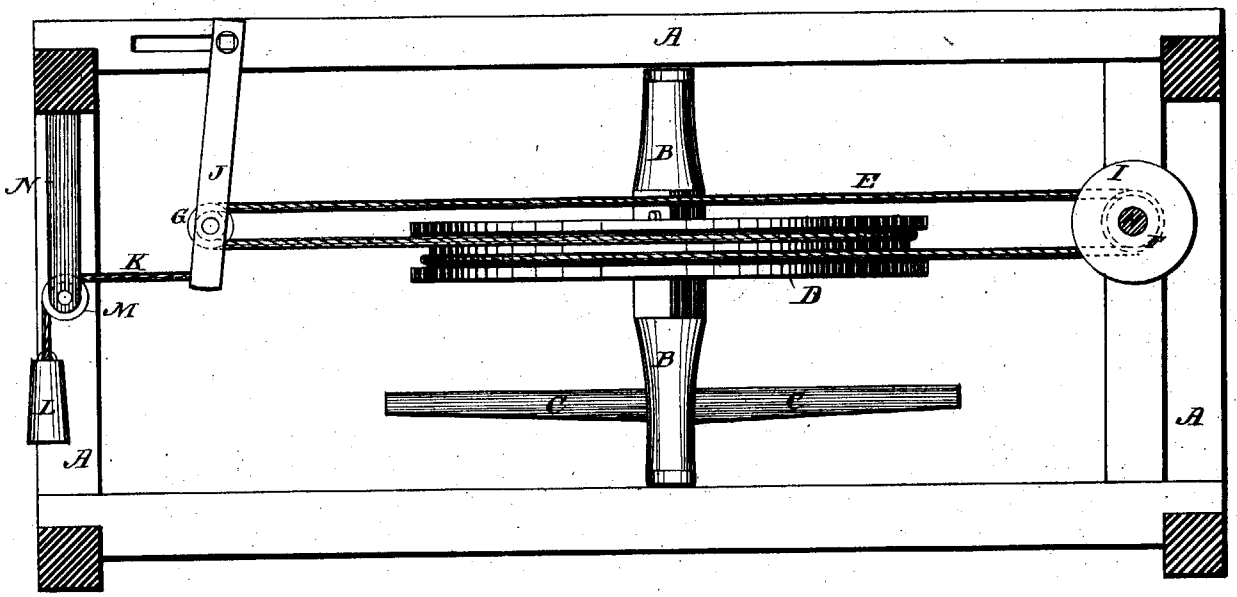
WITNESSES:
A. B. Robertson
Edw. W. Byrn
INVENTOR:
C. E. Macarthy
BY
Munn & Co.
ATTORNEYS.
N. PETERS, PHOTO-LITHOGRAPHER, WASHINGTON, D. C.

UNITED STATES PATENT OFFICE.

CHARLES E. MACARTHY, OF FORSYTH, GEORGIA.

IMPROVEMENT IN HORSE-POWERS.

Specification forming part of Letters Patent No. 201,807, dated March 26, 1878; Reissue No. 8,366, dated August 13, 1878; application filed July 15, 1878.

*To all whom it may concern:*

Be it known that I, CHARLES E. MACARTHY, of Forsyth, in the county of Monroe and State of Georgia, have invented a new and Improved Horse-Power; and I do hereby declare that the following is a full, clear, and exact description of the same, reference being had to the accompanying drawing, forming part of this specification, in which the figure is a side view of the horse-power with the frame in vertical section.

The object of my invention is to provide a cheap and simple form of horse-power, such as may readily be constructed upon plantations for thrashing or grinding grain or ginning cotton.

To this end my invention consists in arranging a horizontal band-wheel on the king-post, a tension-pulley, a speed-pulley, and an endless-rope belt in such relation that while two of the wheels or pulleys are in the same plane and distend the belt, the third is located between the other two in a plane at right angles thereto, and has one side of the belt wrapped entirely around its periphery.

As the best illustration of my invention, A represents the frame-work of the horse-power, in which is arranged, in suitable bearings, the vertical king-post B, carrying one or more levers, C, to which the draft-connection of the team is applied. At a suitable height above the lever is firmly fixed to the king-post a large horizontal band-wheel, D, having upon its periphery a groove to receive the endless-rope belt. E is said belt, which is wrapped once around the king-post wheel D, and is then extended around a speed-pulley, F, on one side and a tension-pulley, G, upon the other. The said speed-pulley F is located upon a shaft, H, carrying a band-pulley, I, designed to receive the band connecting with the gin, thrasher, or mill. The tension-pulley G is journaled in a swinging frame, J, pivoted at the top to the frame-work by means of a slot and bolt, and is strained to tighten the belt by means of a weight, L, connected to the said swinging frame by a cord, K, which passes over a roller, M, fixed in a frame, N.

The advantages of this arrangement of horse-power are to be found in its cheapness, simplicity, and absence of noise. The endless-rope belt, also, while costing not more than one-sixth as much as a rubber band, possesses the further advantage, in this peculiar arrangement of parts, of transmitting power from one band-wheel to another, at right angles thereto, without the objectionable twisting of the band and the tendency of the same to run off the wheel.

I am aware of the fact that an endless-rope belt has been heretofore driven by a series of radial reel-arms having forks at their extremities to receive the belt, which reel-arms were arranged in a similar relation to a tension and speed pulley, as in my invention. The reel-arms in such relation are objectionable, however, for the reason that they have a tendency to throw the rope first to one side, and then to the other, of the pulley to which it is fed, thus necessitating an intermediate guide-pulley to cause the rope to be fed in a straight line to the pulley receiving it from the reel. If there is any sag or looseness in the rope, also, which is not taken up by the tension-pulley, the seating of the rope in the forks of the reel is uncertain. By using a main pulley or master-wheel having a continuous circular periphery and flange it will be seen that the intermediate pulley may be arranged tangentially to the rope passing from the pulleys at the opposite ends, and the rope is paid out from the master-wheel at a tangent and in a true and unvarying line to the pulley to which it is fed, thus dispensing with intermediate guide-pulleys, and also avoiding the throwing of the rope first to one side and then the other, as occurs when fed directly from the reel-arms. I therefore only claim the combination described, when the master-wheel has a continuous circular periphery and flange, and when the intermediate pulley (which is at right angles to the end pulleys) is tangential to the side of the belt extended from the two end pulleys.

Having thus described my invention, what I claim as new is—

The improved horse-power, consisting of the combination of an endless-rope belt, a tension-pulley, a speed-pulley, and a horizontal pulley or band wheel on the king-post, having a continuous periphery and flange, two of said pulleys being in the same plane and distending the belt, while the third is arranged between the end pulleys, at right angles to the plane of the same, and has the rope wrapped once around its periphery and then extended tangentially in a straight line to the other two pulleys, substantially as shown and described.

C. E. MACARTHY.

Witnesses:
EDWD. W. BYRN,
H. T. MATHEWS.